J. B. TATE.
FUEL TANK SEALING VALVE.
APPLICATION FILED AUG. 25, 1917.
1,271,521.
Patented July 2, 1918.
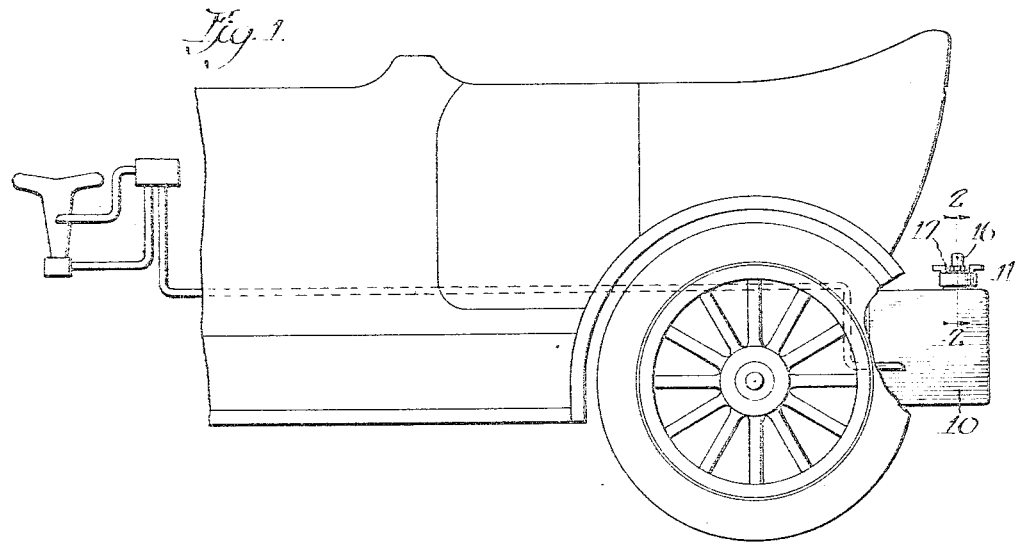
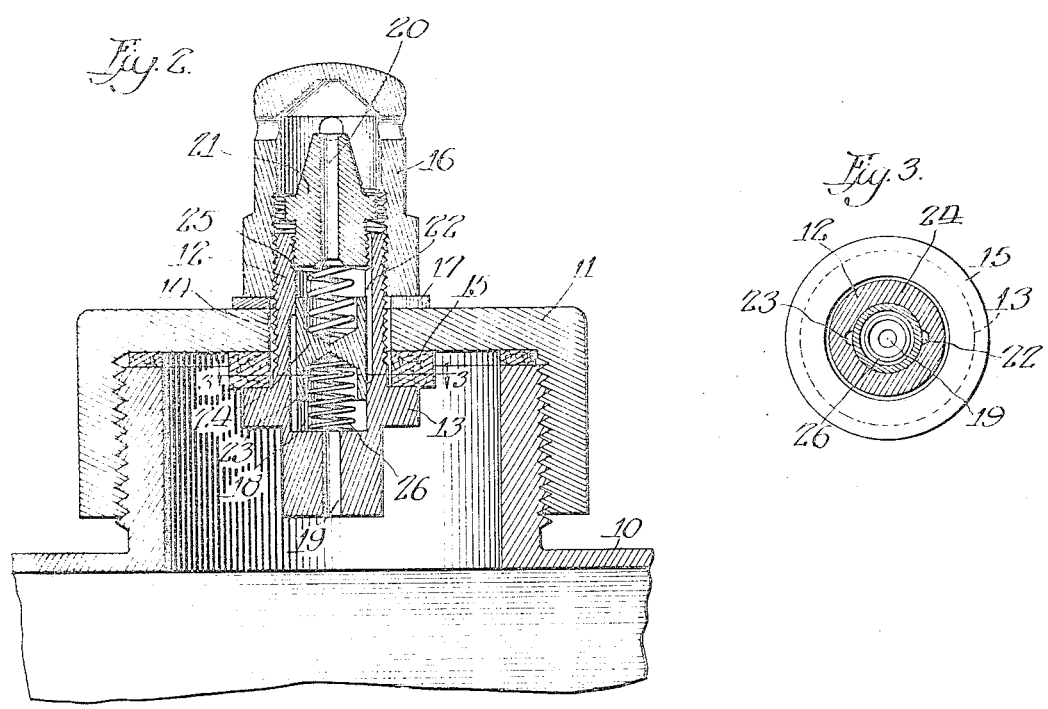
Witness.
C. H. Roesener.
Inventor.
John B Tate
By Chas P Murray
Atty.

UNITED STATES PATENT OFFICE.

JOHN B. TATE, OF ALTOONA, PENNSYLVANIA.

FUEL-TANK-SEALING VALVE.

1,271,521.

Specification of Letters Patent.

Patented July 2, 1918.

Application filed August 25, 1917. Serial No. 188,102.

*To all whom it may concern:*

Be it known that I, JOHN B. TATE, a citizen of the United States, residing at Altoona, in the county of Blair and State of Pennsylvania, have invented certain new and useful Improvements in Fuel-Tank-Sealing Valves, of which the following is a specification.

My invention relates to the fuel tanks for automobiles and similar devices which utilize liquid fuel and particularly to a novel valve adapted for application to such tanks.

It is now becoming common practice to employ a fuel tank located at the rear of automobiles and below the level of the carbureter, the fuel being fed into a small elevated tank by vacuum induced in the intake manifold of the engine. It is essential in such systems that the tank be provided with a vent or small aperture, preferably located in the filler cap in order to permit of the entrance of air to replace the liquid withdrawn from the tank. This aperture, although of small size, results in the loss of considerable fuel by vaporization. Furthermore, when the tank is full or partly full, more or less fuel escapes through the opening by splashing when the car is in motion.

Not only is there considerable loss in the manner described, but there is considerable danger as well. The sloping of the fuel on the exterior of the tank presents the constant danger of fire, and in the event of an accident in which the car is overturned the escape of gasolene at this point should be avoided. An object in the present construction is to provide means whereby the fuel tank is normally sealed, although permitting the entrance of air to compensate for the withdrawal of fuel. A further object is to so construct the valve as to insure its operation at all times even though one or both of the controlling springs therefor should be broken.

The invention will be more readily understood by reference to the accompanying drawing in which—

Figure 1 is a fragmentary side elevation of an automobile having a tank which has my improvement applied thereto;

Fig. 2 is an enlarged sectional detail of the valve showing its application to the tank, and Fig. 3 is a sectional view on the line 3—3 of Fig. 2.

In the drawing it will be seen that the improvement is applied to a tank 10 located at the rear of an automobile, the tank having a filling opening adapted to be closed by a cap 11 in the usual manner.

The valve of my invention comprises a casing 12 having an integral flange 13, the casing being seated in a suitable aperture 14 formed at the center of the cap. A packing washer 15 is interposed between the flange 13 and the cap 11, a nut in the form of an apertured closure 16 serving to securely hold the valve in proper position. If desired, a split or locking washer 17 may be utilized for preventing accidental displacement of the parts.

The casing is provided with a central cavity 18 which is open at its two ends through the apertures 19 and 20 the latter being formed in a threaded closure 21 for the upper end of the cavity. Two grooves 22, 23, are formed on the walls of the cavity, the lower end of the former being at a point above the lower end of the cavity, the upper end of the latter groove being at a point below the upper end of the cavity. These grooves are in effect by-passes which operate in conjunction with the cylindrical valve-member 24 which closely fits the cavity but is fairly reciprocable therein. The valve member is normally held in the position shown in Fig. 2 by upper and lower springs 25 and 26 respectively, the ends of which are received within recesses formed in the respective ends of the valve member. The upper spring 25 is considerably stronger than the lower spring and each spring is formed of such length that when the valve is in the position shown, that is, an intermediate position in which both the by-passes 22 and 23 are closed, the springs are inert, that is, neither thereof is exerting expansive force. Thus, when the parts are in normal position, neither of the springs is compressed, and there is no tendency toward breakage thereof. When a small vacuum is induced in the tank 10, the weaker spring 26 will be overcome and the valve member pulled downwardly until the by-pass 23 is open and air may enter the tank. If an abnormal pressure should develop within the tank the heavier spring 25 will be overcome and the by-pass 22 will be opened. It will be noted that if either of the springs, or both thereof are broken, there will be no interference with the supply of fuel from the tank, as in that event the valve member will drop to an extent sufficient to open the by-pass 23. Even under those circumstances, there can be no escape of fuel from the tank, as any movement of the liquid forcibly through the opening 19 will lift the valve member and close the by-pass 23.

It will be understood that it is not essential that the valve-member be located in the filler cap as shown. It is shown in this position because of the simplicity in applying the same. Neither is the invention limited for use in connection with the fuel tank of an automobile, as it may be applied in other situations with equally good results.

I claim:

1. In a vacuum liquid-fuel feed for automobiles, the combination of a fuel tank, means for withdrawing fuel therefrom by vacuum, and means including a sealing valve responding to both internal and external pressure to vent the tank and to supply air thereto.

2. In a vacuum liquid-fuel feed for automobiles, the combination of a fuel tank, means for withdrawing fuel therefrom by vacuum, and means to automatically open an intake in the reservoir to permit the intake of air under a reduction of pressure in the reservoir and to close the intake when normal pressure is restored.

3. A valve comprising in combination a casing, and a valve member fitting within the casing and reciprocable therein, said casing having two internal grooves which terminate in the plane of the valve-member when the same occupies an intermediate position, the opposite ends of the grooves communicating with the opposite open ends of the casing, substantially as described.

4. A valve comprising in combination, a casing having a cylindrical opening, the internal wall of the casing having a pair of longitudinally-offset grooves, a cylinder closely fitting and reciprocable within the opening, said grooves being so positioned that one end of both thereof is closed when the cylinder is in an intermediate position, substantially as described.

5. A valve comprising in combination, a casing having a cylindrical opening, the internal wall of the casing having a pair of longitudinally-offset grooves, a cylinder closely fitting and reciprocable within the opening, said grooves being so positioned that one end of both thereof is closed when the cylinder is in an intermediate position, and a spring at each end of said cylinder for causing the same normally to lie in an intermediate position, substantially as described.

6. A valve comprising in combination, a casing having a cylindrical opening, the internal wall of the casing having a pair of longitudinally-offset grooves, a cylinder closely fitting and reciprocable within the opening, said grooves being so positioned that one end of both thereof is closed when the cylinder is in an intermediate position, and a spring at each end of said cylinder, said springs being so designed as to exert no force when the cylinder is in normal position, substantially as described.

7. In a valve, a hollow casing, a cylinder closely fitting therein, said casing being provided with a plurality of by-passes around the cylinder, said by-passes being so positioned as to provide a point at which all communication through the valve is closed, and compression springs one at each end of the cylinder, said springs being fully expanded when the cylinder is at the point of closed communication, substantially as described.

8. In a valve, a hollow casing, a cylinder closely fitting therein, said casing being provided with a plurality of by-passes around the cylinder, said by-passes being so positioned as to provide a point at which all communication through the valve is closed, and compression springs one at each end of the cylinder, said springs being of different capacities, substantially as described.

9. In a valve, a hollow casing, a cylinder closely fitting therein, said casing being provided with a plurality of by-passes around the cylinder, said by-passes being so positioned as to provide a point at which all communication through the valve is closed, and compression springs one at each end of the cylinder, said springs being of different capacities and being fully expanded when the cylinder is at the point at which communication through the valve is closed, substantially as described.

JOHN B. TATE.

Witness:
HARRY G. GREENE.